United States Patent
Bhageria et al.

(10) Patent No.: US 10,931,108 B2
(45) Date of Patent: Feb. 23, 2021

(54) SCHEDULING THE ACTIVITIES OF DAILY LIVING (ADLS) WITH MINIMUM POWER USAGE COST ON SMART GRID NETWORK

(71) Applicant: International Business Machines Corporation, Armonk, NY (US)

(72) Inventors: Gopal Kumar Bhageria, Kolkata (IN); Krishnasuri Narayanam, Bangalore (IN); Ramasuri Narayanam, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 55 days.

(21) Appl. No.: 15/708,601

(22) Filed: Sep. 19, 2017

(65) Prior Publication Data
US 2019/0089159 A1    Mar. 21, 2019

(51) Int. Cl.
*H02J 3/14*    (2006.01)
*G05B 13/02*    (2006.01)

(52) U.S. Cl.
CPC .............. *H02J 3/14* (2013.01); *G05B 13/026* (2013.01); *H02J 2310/14* (2020.01); *H02J 2310/64* (2020.01)

(58) Field of Classification Search
None
See application file for complete search history.

(56) References Cited

U.S. PATENT DOCUMENTS

| 7,783,390 | B2 | 8/2010 | Miller |
| 8,364,609 | B2* | 1/2013 | Ozog ............... G06Q 10/06315 705/412 |
| 8,587,438 | B2 | 11/2013 | Abernethy et al. |
| 9,230,560 | B2 | 1/2016 | Ehsani et al. |

(Continued)

FOREIGN PATENT DOCUMENTS

CN    204517418    7/2015

OTHER PUBLICATIONS

Du, "Appliance Commitment for Household Load Scheduling", Jun. 2011, IEEE Transactions on Smart Grid, vol. 2 No. 2, pp. 411-418 (Year: 2011).*

(Continued)

*Primary Examiner* — Mohammad Ali
*Assistant Examiner* — David Earl Ogg
(74) *Attorney, Agent, or Firm* — Aaron N. Pontikos

(57) ABSTRACT

The present invention is a system and method for optimizing power on a smart grid network. The system includes one or more units, such as a smart home, each having a control center with a historical database. The control center is in digital communication with a network component of a smart grid. Historical data including a soft window period and a hard window period representing acceptable start times for one or more flexible ADLs are stored in the historical database. The network component receives historical data for the flexible ADLs from multiple control centers. The network component, which creates a schedule based at least in part on the historical data and transfers energy to the (Continued)

control center according to the schedule. While scheduling, the network component manages peak load, energy tariffs, penalties, forecasting of non-ADL demand, and forecasting of supply over the scheduling horizon among other things.

14 Claims, 4 Drawing Sheets

(56) References Cited

U.S. PATENT DOCUMENTS

| | | | | |
|---|---|---|---|---|
| 9,645,596 | B1* | 5/2017 | Lee | G05F 1/66 |
| 2010/0201573 | A1 | 8/2010 | Lamming | |
| 2011/0046805 | A1 | 2/2011 | Bedros et al. | |
| 2013/0144451 | A1* | 6/2013 | Kumar | G05B 13/02 |
| | | | | 700/291 |
| 2015/0145335 | A1* | 5/2015 | Lyren | H02J 3/14 |
| | | | | 307/39 |
| 2018/0212427 | A1* | 7/2018 | Niikura | G06Q 50/06 |

OTHER PUBLICATIONS

Lanzenberger, Monika, "Smart Living Environments for Active and Healthy Ageing"; https://docbox.etsi.org/Workshop/2016/20160322_IOT_SMART_HOME_WS/S05_STANDARDISATION/Smart%20Living%20Environments%20for%20Active%20and%20Healthy%20Ageing_EC_LANZENBERGER_20160322.pdf; Mar. 22, 2016; 16 pages.

Cho Hyun Sang & Yamazaki, Tatsuya & Hahn, Minsoo; "AERO: Extraction of User's Activities from Electric Power Consumption Data"; IEEE, 2011; 8 pages; (link to abstract https://www.researchgate.net/publication/224184137_AERO_Extraction_of_User%27s_Activities_from_Electric_Power_Consumption_Data).

ADSA Illinois at Singapore Pte Ltd: Living Lab "Smart Grid: Demand-side Management"; http://publish.illinois.edu/incentive-pricing/living-lab/; printed Sep. 18, 2017; 2 pages.

"Advanced Metering Infrastructure AMI 'Smart' Meters in Massachusetts"; HaltMAsmartMeters.org/Comprehensive_Booklet; Sep. 2013, 1st Edition; 40 pages.

Xie, Xia, et al.; Abstract—"Pricing Strategies in Grid market: Simulation and Analysis"; http://ieeexplore.ieee.org/abstract/document/4662912/; Date added to IEEE Xplore Oct. 31, 2008; DOI: 10.1109/GCC.2008.110; 3 pages.

Smartgrid.Gov; Time Based Rate Programs;https://www.smartgrid.gov/recovery_act/time_based_rate_programs.html; printed Sep. 19, 2017; 2 pages.

Joe-Wong, Carlee, et al.; "Optimized Day-Ahead Pricing for Smart Grids with Device-Specific Scheduling Flexibility"; IEEE Journal on Selected Areas in Communications, vol. 30, Issue: 6, Jul. 2012; Abstract provided—DOI: 10.1109/JSAC.2012.120706; http:ieeexplore.ieee.org/document/6194235/; printed Sep. 19, 2017; 4 pages.

ADSC Illinois at Singapore Pte Ltd; Dynamic Pricing "Smart Grid: Demand-side Management"; https://publish.illinois.edu/incentive-pricing/pricing/; printed Sep. 19, 2017; 2 pages.

Cook, D.J., et al.; "Assessing the Quality of Activities in a Smart Environment"; http://eecs.wsu.edu/~cook/pubs/mim09.pdf; printed Sep. 17, 2017; 19 pages.

Bae, Ihn-Han, et al.; "An Ontology-Based ADL Recognition Method for Smart Homes"; DOI https://doi.org/10.1007/978-3-642-27201-1_42; copyright Springer-Verlag Berlin; Heidelberg 2011; Abstract https://link.springer.com/chapter/10.1007%2F978-3-642-27201-1_42?LI=true; printed Sep. 19, 2017; 4 pages.

Chan, Marie, et al.; "A review of smart homes—Present state and future challenges"; DOI https://doi.org/10.1016/j.cmpb.2008.02.001; copyright 2008 Elsevier Ireland Ltd.; Abstract http://www.sciencedirect.com/science/article/pii/S0169260708000436; printed Sep. 19, 2017; 3 pages.

McMillin, Bruce; "Smart Living: Technology, Environment, and Security"; IEEE Smart Grid May 2015; accessed through https://web.archive.org/web/20160311072322/http://smartgrid.ieee.org:80/newsletters/may-2015/smart-living-technology-environment-and-security; printed Sep. 19, 2017; 3 pages.

\* cited by examiner

SCHEDULING THE ACTIVITIES OF DAILY LIVING (ADLS) WITH MINIMUM POWER USAGE COST ON SMART GRID NETWORK

BACKGROUND

The present invention relates generally to optimizing power usage on a smart grid network, and more particularly to intelligently scheduling activities of daily life within a smart home using data from smart meters from different smart homes and the smart grid.

An electrical grid is a network of transformers, substations, and individual units connected by transmission lines. Traditionally, electricity was delivered to individual units in home, businesses, and other structures from power plants or power stations via the transmission lines. Thus, the electrical grid was a unidirectional system for the transmission of electric power. Over time, through the invention and development of electric-consuming home and workplace technologies, the demand for electric power increased. As the demand increased, more power plants or power stations were established. However, the power plants could not keep up with the demand, especially during peak times. As a result, the demand was tracked in order to generate demand patterns.

Due to the increase in demand for electric power, there were growing environmental concerns and pressure to develop a highly controllable and more efficient electrical transmission system. In response, through the advancement of digital technology, "smart grid" technology was developed. Smart grid technology permits two-way communication between a utility and its customers. Thus, the second pathway of communication allows feedback from the customer to the utility. For example, the utility may receive information regarding power outages and isolate the outage by rerouting the electricity in order to prevent a large-scale outage or blackout. In addition, digital communication between the utility and the customer allows the smart grid to better respond to energy demands. For instance, the smart grid permits integration of smart meters and smart appliances in an advanced metering infrastructure (AMI). Smart meters and smart appliances provide energy consumption feedback to the utility. In response to demand patterns, the smart appliances may adjust their duty cycle to avoid operation during peak times (i.e., when the energy is in high demand).

The smart grid also allows for integration of renewable energy resources, such as solar panels or wind turbines, and energy efficient resources, such as electric cars. With renewable energy resources and energy efficient resources, the smart grid can accommodate a bidirectional flow of energy. Thus, energy can be transferred between the renewable energy resources or energy efficient resources and the utility to ultimately pass to customers. Therefore, smart grid technology provides a highly controllable system for electricity allocation.

As smart grid technology is highly controllable, pricing for electricity usage can be tailored to the circumstances of each customer. Currently, smart gird networks having different pricing mechanisms. Such pricing mechanisms include peak load pricing, off peak pricing, and pricing for home usage versus industrial usage. Different pricing mechanisms begin at different points of time in the day or at different points of time in the week. During the day, the pricing for usage of power on the smart grid may not be constant. For example, there may be a high price in the evening and low price in the morning. Customers want to take advantage of off peak pricing mechanisms and customize power consumption of their appliances to pay the lower price. However, current systems smart home systems offer little scheduling control.

Therefore, there is a need for a system and method for using data from smart meters and a smart grid in association with the advanced metering infrastructure (AMI) to intelligently schedule the use of appliances as they relate to activities of daily living in order optimize the overall power usage and minimize cost.

SUMMARY

The present invention is a system and method for optimizing power on a smart grid network. In one embodiment, the system includes, but is not limited to, one or more units, such as a smart home, each having a control center with a historical database. The control center is in digital communication with a network component of a smart grid. Historical data including a soft window period and a hard window period representing acceptable start times for a flexible ADL are stored in the historical database. The network component receives historical data for the flexible ADLs from multiple control centers (i.e., each control center might transmit historical data about multiple ADLs, and different control centers might transmit historical data about their flexible ADLs where there may or may not be common ADLs across all control centers). The control centers of different units (e.g., smart homes) transmit historical data for the flexible ADLs to the network component, which creates a schedule based at least in part on the historical data and transfers energy to the control centers according to the schedule.

In another embodiment, a method for optimizing power on a smart grid network includes, but is not limited to, the steps of: (i) providing one or more units having a control center with a historical database, the control center in digital communication with a network component of a smart grid; (ii) determining, via the control center, one or more ADLs for each unit and a start time for each ADL, wherein the start time for each ADL is determined based on historical start time data stored in the historical database; and (iii) transmitting the ADLs and start times, via the control center, to the network component, wherein the network component creates a schedule based at least in part on the ADLs and start times.

In an alternative embodiment, a method for optimizing power on a smart grid network includes, but is not limited to, the steps of: (i) categorizing ADLs into flexible ADLs and non-flexible ADLs; (ii) attributing each ADL to an energy-consuming apparatus, wherein the energy-consuming apparatus alternates between an open position and a closed position, in which the energy-consuming apparatus receives energy in the open position and does not receive energy in the closed position; (iii) determining a variable start time for each flexible ADLs and a fixed start time for the non-flexible ADLs; and (iv) creating a schedule wherein each energy-consuming apparatus moves from the closed position to the open position at the fixed start time for any attributed non-flexible ADL and at the variable start time for any attributed flexible ADL.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
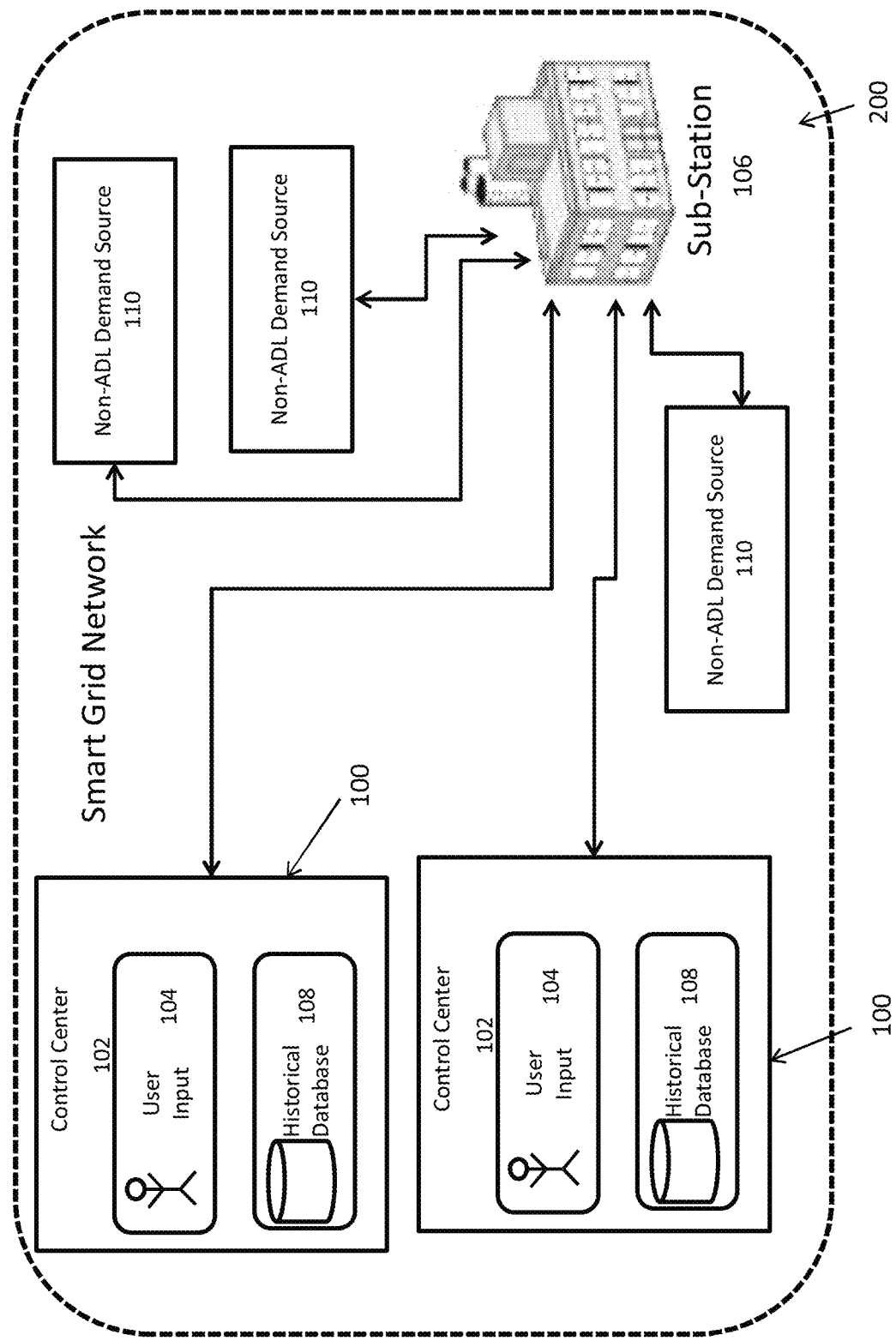
FIG. 1 is a diagram of a non-limiting illustrative embodiment of the system for optimizing power usage of a smart grid network.

Referring to the Figures, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring again to the drawings, wherein like reference numerals refer to like parts throughout, there is seen in FIG. 1 a diagram of a non-limiting illustrative embodiment of the system 100. The system 100 comprises a smart home control center 102 with a historical database 108. The control center 102 is connected to a sub-station 106 on a smart grid in a smart grid network 200. The sub-station 106 receives digital signals from the control center 102 to detect and respond to changes in electricity usage. The historical database 108 stores historical data from smart meters at individual customer control centers 102 and the smart grid network 200. As described herein, the historical data in the historical database 108 is used in association with the advanced metering infrastructure (AMI) to intelligently schedule the use of appliances as they relate to activities of daily living.

Activities of daily living (ADL) is a term often used in the healthcare industry to refer to a person's daily self-care activities, such as eating, bathing, dressing, personal hygiene and grooming, toileting, and transferring (i.e., walking, and getting in/out of a bed or chair). It is possible to categorize ADLs based on the kind of the functionality they serve or the time at which the appliance used needs to be activated. Some ADLs may need to begin at fixed times, while other ADLs may be flexibly scheduled during a time range. For example, a flexible ADL may be the time at which to start the washing machine, to wash and dry clothes. This activity can be done at any time during the day, when the user is in the office, for example, so that the clothes are washed and/or dried by the time the user comes home in the evening. Therefore, appliances, such as a washing machine, may be correlated or assigned to ADLs. Thus, it is possible to intelligently schedule ADLs within a smart home using historical data from smart meters at individual customer control centers 102 and the smart grid network 200 in association with the advanced metering infrastructure (AMI).

Still referring to FIG. 1, ADLs can be scheduled for individual customer control centers 102 using an optimization model. The optimization model considers both ADL demand and non-ADL demand on the sub-station level 106. Therefore, the system 100 in FIG. 1, optimizes energy transmission considering both individual control centers 102 with ADL demand and non-ADL demand sources 110. The individual control centers 102 can be smart homes, smart office spaces, or some other building utilizing smart technology, which have an ADL demand based on the functionality the ADL serves and the appliances used. The non-ADL demand sources 110 may also be smart homes, commercial or industrial buildings, and other public places. Although, in the optimization model described herein, the non-ADL demand sources 110 do not have ADLs which are intelligently scheduled, the energy load of the non-ADL demand sources 110 must be considered.

Figure 3:
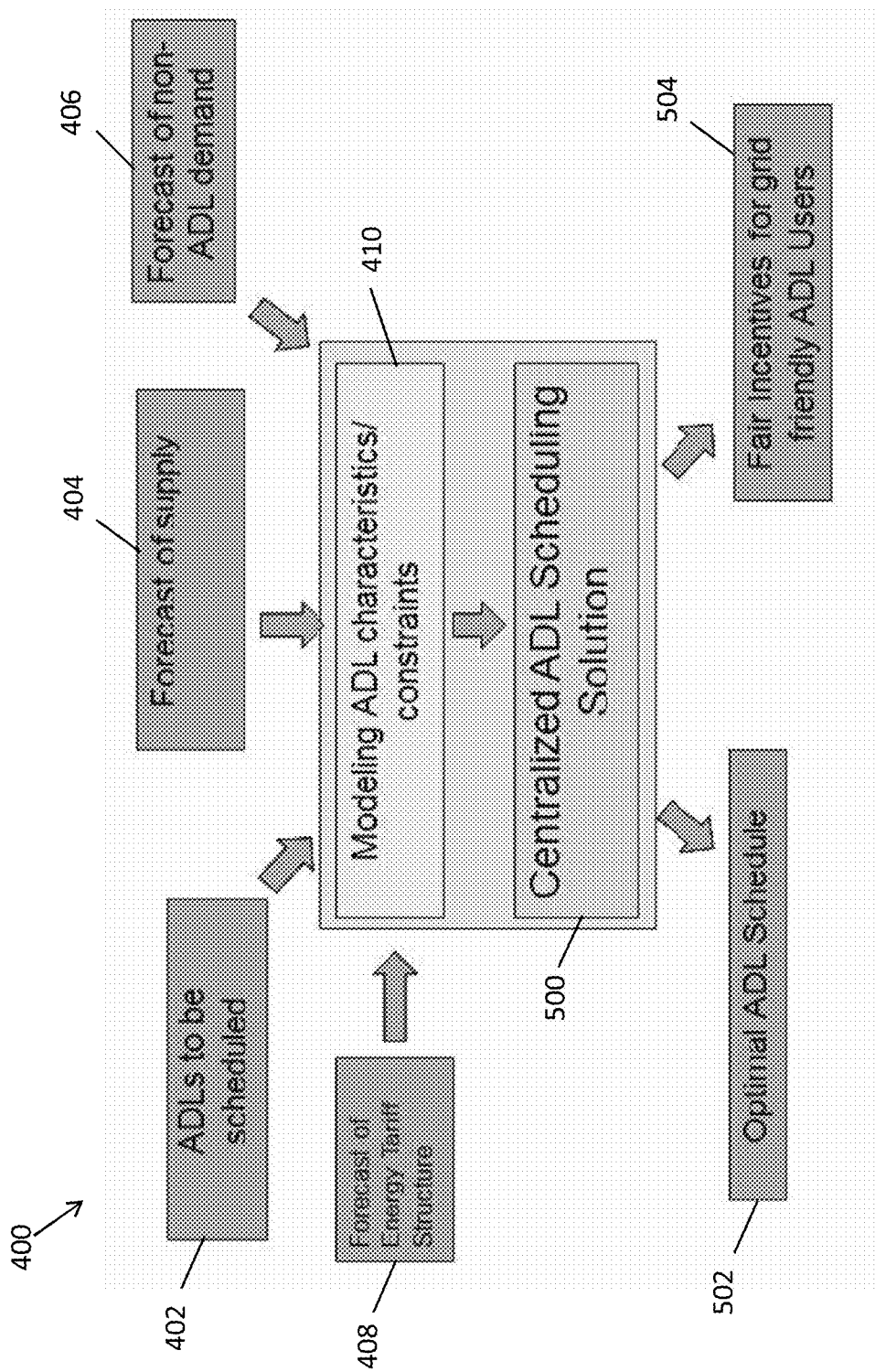
FIG. 3 is a diagram of a non-limiting illustrative embodiment of the method for optimizing power usage on a smart grid network.

Referring to FIG. 3, there is shown a diagram of a non-limiting illustrative embodiment of the method for optimizing power usage on a smart grid network. FIG. 3 provides the architecture of a sample embodiment of the system 300 and working method of scheduling ADL demand at the sub-station level 106 (shown in FIG. 1) along with the predicted non-ADL demand 402 and the predicted supply 404 for the day. Specifically, the centralized ADL scheduling 500 on the sub-station 106 (in FIG. 1) considers the inputs ADLs to be scheduled 402, the supply forecast 404, the forecast of non-ADL demand 406, and the forecast of energy tariff structure 408 (assuming the energy tariff follows some pricing mechanism accommodating peak & non-peak demand requirements). The optimization method described herein models the ADL characteristics/constraints 410 (e.g., penalty model for a flexible ADL being scheduled beyond a soft window period but a within hard window period). Finally, the optimization model produces an 'optimal ADL schedule' 502 as the primary output. In addition, the optimization model may also produce incentives 504 for grid-friendly ADL users. Further, the optimization model produces the optimal ADL schedule 502 and incentives 504 while optimizing some objective criteria (e.g., minimizing the total penalty cost, minimizing operational costs, minimizing the number of not scheduled non-ADLs, or a linear combination of a subset of these components).

Figure 2:
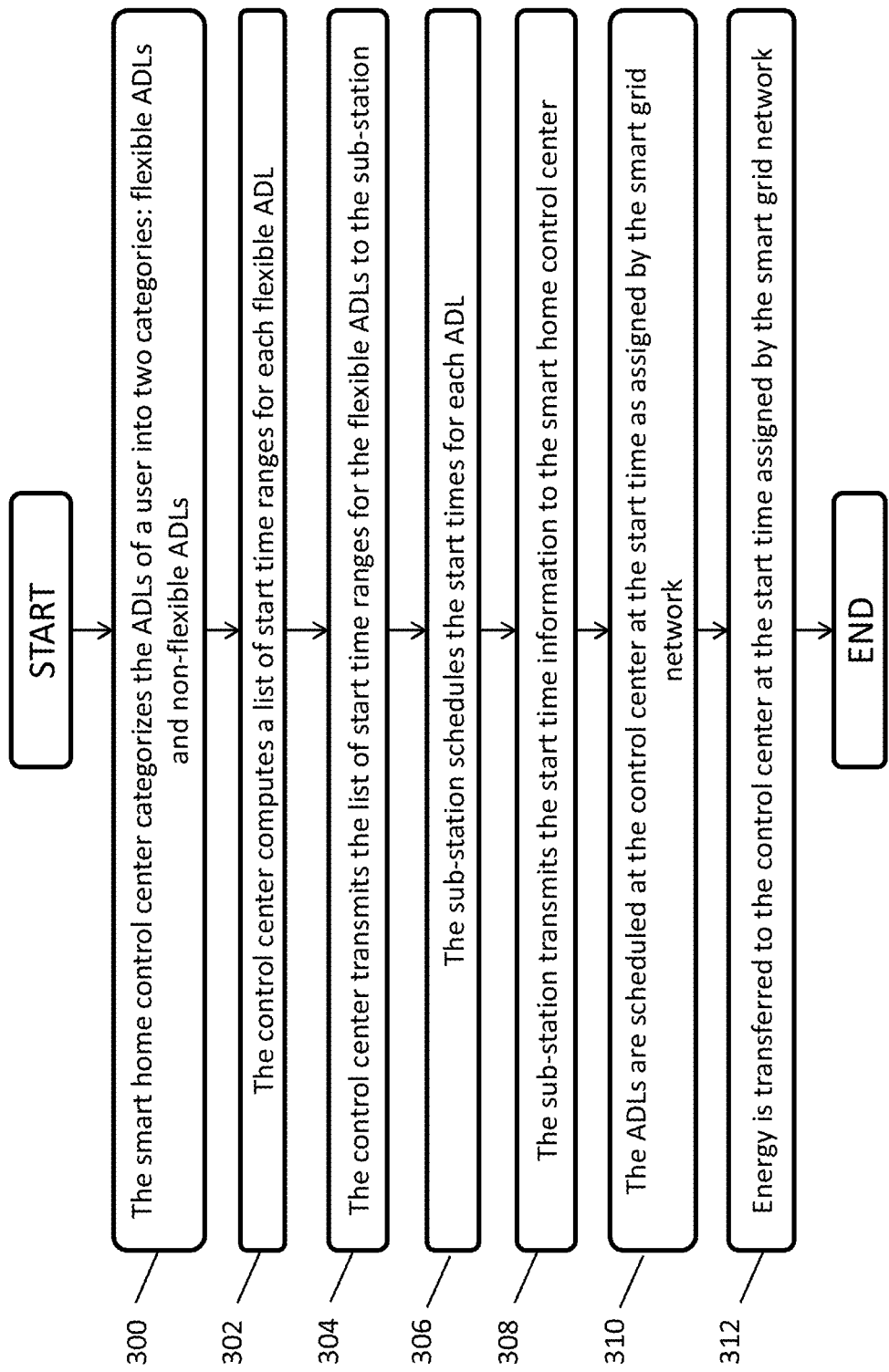
FIG. 2 is a flowchart of a non-limiting illustrative embodiment of the method for optimizing power usage on a smart grid network.

Referring now to FIG. 2, there is shown a diagram of an illustrative embodiment of a method for optimizing power usage on a smart grid network 200. The purpose of the method is to minimize the overall power usage cost across all the ADLs at the smart grid network 200. These ADLs belong to one or more users at individual control centers 102 of the smart grid network 200, and each of these users have one or more ADLs. At the first step 300, the smart home control center 102 for an individual user categorizes the user's ADLs into two groups: flexible ADLs and non-flexible ADLs. An ADL is categorized as non-flexible if it has a fixed start time and categorized as flexible if it has a variable start time.

At the second step 302, the control center 102 computes a list of start time ranges for each flexible ADL. The start time range includes and extends between a first start time and a second start time. The first start time represents the earliest start time for the flexible ADL, while the second start time represents the latest start time for the flexible ADL. The earliest and latest start times are computed by the control center 102 by applying machine learning techniques on historical data of start times for the particular ADL. Such historical data may be stored in a historical database 108 in the smart home control center 102, as shown in FIG. 1.

Next, at step 304, the control center 102 transmits the list of start time ranges for the flexible ADLs to the sub-station 106 (or any other component at the network level) of the smart grid network 200. In an alternative embodiment, the system 100 is maintained in the cloud, where scheduling would occur, instead of being maintained in the sub-station 106. Referring back to step 304, in one embodiment, the start time range is transmitted as: [earliest start time, latest start time] for each respective ADL. Each sub-station 106 has the demand forecast for the users available before receiving the list of start time ranges. After receiving the list of start time ranges from the control center 102, the sub-station 106 has additional demand details of the ADLs from the control center 102 of each user on the smart grid network 200. Each ADL will have the expected amount of load it adds to the smart grid network 200.

Then, at step 306, the sub-station 106 schedules the start times for each ADL. The sub-station 106 utilizes a scheduling algorithm (i.e., optimization model) to minimize the overall usage cost across all the ADLs. Constraints on the optimization model include: (i) all the ADLs have to be scheduled and (ii) the schedule should try to avoid peak load scenarios on the sub-station 106. Further, as the bounds for the optimization model, each ADL scheduled start time should be within a soft window period, defined as: [earliest start time, latest start time].

The optimization model, in particular, determines the optimal start time allocation of the ADLs using the following decision variables, constraints, objective function, bounds, etc.

Below are few of the indicator variables used for modeling ADL characteristics:

Let $(s_1, s_2, \ldots, s_m)$: be the 'start times' of the 'm' ADLs
$(e_1, e_2, \ldots, e_m)$: be the 'end times' of the 'm' ADLs
$(l_1, l_2, \ldots, l_m)$: be the 'lengths' of the 'm' ADLs
$(es_1, es_2, \ldots, es_m)$: be the 'earliest start times' of the 'm' ADLs
$(ls_1, ls_2, \ldots, ls_m)$: be the 'latest start times' of the 'm' ADLs
$(les_1, les_2, \ldots, les_m)$: be the 'least earliest start times' of the 'm' ADLs
$(gls_1, gls_2, \ldots, gls_m)$: be the 'greatest latest start times' of the 'm' ADLs
$M_{ij}=1$: if i-th ADL is starting in hour j, otherwise $M_{ij}=0$
$M_{i0}=1$: if i-th ADL is not scheduled in any hour [1,24]
$X_{ij}=1$: indicator variable is set if i-th ADL is scheduled in hour j Each of the ADL start times $s_i$ is given a value '0' if ADL is not scheduled, and given a value [1,24] if it is scheduled.
For each scheduled ADL 'i', '$s_i+l_i=e_i$' (i.e., 'start time'+'length'='end time')
For any scheduled ADL 'i', '$es_i<=s_i<=ls_i$' (i.e., 'earliest start time'<='start time'<='latest start time')
For any ADL 'i' that is scheduled with penalties, '$les_i<=s_i<=gls_i$' (i.e., 'least earliest start time'<='start time'<='greatest latest start time')

However, in one embodiment, it is possible that some flexible ADLs will be scheduled beyond their [earliest start time, latest start time] soft window period, with some penalty (provided to the system 100 by the user). As such, there is a hard window period wherein such ADLs must be scheduled at a penalty. The hard window limits are defined as: [least earliest start time, greatest latest start time] and can be derived through machine learning algorithms using historical ADL execution patterns. The hard window limits may also be configurable by the user. Regarding the optimization model, a penalty is associated if the ADL 'i' is scheduled within the hard window period but not in the soft window period (i.e., Penalty$_i$).

Figure 4:
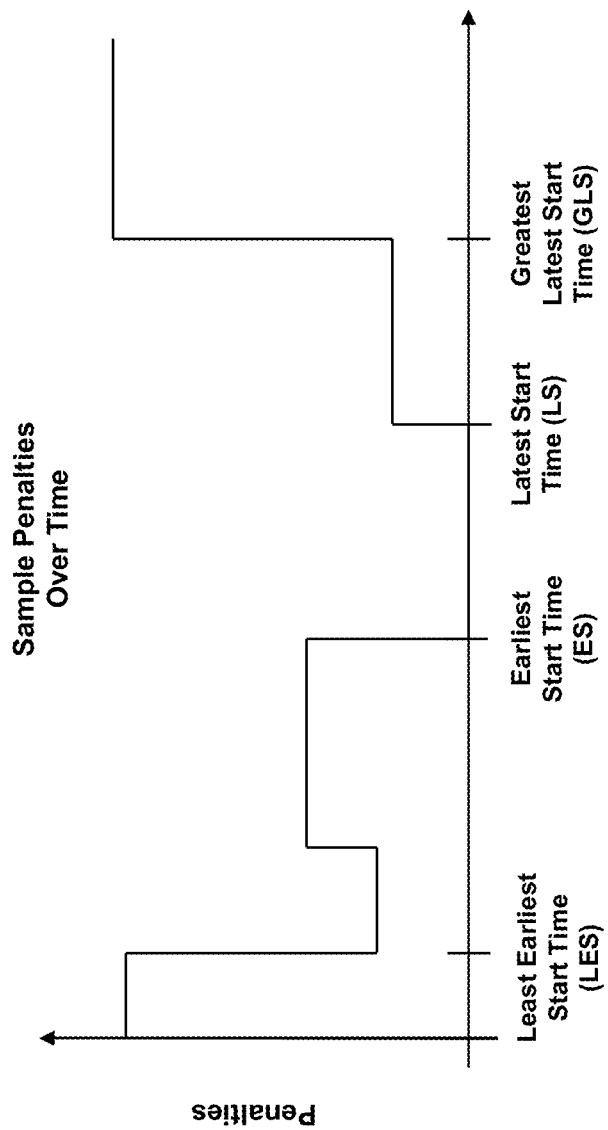
FIG. 4 is a diagram of a non-limiting illustrative embodiment of penalties accrued over time.

In some embodiments, the penalty associated with the ADL scheduled in the hard window is fixed. In other embodiments, the penalty can be time-dependent. In other words, the farther in time an ADL is scheduled outside of the soft window period, the higher or more expensive the penalty. FIG. 4 shows a diagram of a non-limiting illustrative embodiment of penalties accrued over time. Specifically, FIG. 4 depicts a penalty structure where there is no penalty if an ADL gets scheduled within the desired soft window time periods (i.e., [earliest start time, latest start time]). If the ADL gets scheduled beyond this desired interval, the penalties are different based on how much they exceed this desired interval, and on which side of this interval they fall into.

The following step functions may be used to model such penalty structures.

Sample 'Fixed Penalty' model:

$\forall_{i\in[1,m]\wedge(t\in[les_i,es_i]\vee t\in[ls_i,gls_i])}\text{Penalty}_i(t)=c_i$ In the above equation, $c_i$ is a constant defined for each ADL 'i'
't' represents the start time of an ADL as scheduled by the optimization model.

$\forall_{i\in[1,m]\wedge t\in[es_i,ls_i]}\text{Penalty}_i(t)=0$ $\forall_{i\in[1,m]\wedge(t<les_i\vee t>gls_i)}\text{Penalty}_i(t)=lc_i$ Here, $lc_i$ may be some constant representing the penalty which is much larger than the value $c_i$ above.

Sample 'Time Varying Penalty' model:

$\forall_{i\in[1,m]\wedge(t\in[les_i,es_i]\vee t\in[ls_i,gls_i])}\text{Penalty}_i(t)=t$ As per the above definition, if the start time of an ADL 'i' is $c_i$, then its penalty is also $c_i$.

$\forall_{i\in[1,m]\wedge t\in[es_i,ls_i]}\text{Penalty}_i(t)=0$ $\forall_{i\in[1,m]\wedge(t<les_i\vee t>gls_i)}\text{Penalty}_i(t)=c$ Here, 'c' may be some constant representing the penalty which is much larger than the value 't' above.

In an embodiment, the penalty for an ADL getting scheduled within the [$es_i$, $ls_i$] interval could be 0 (which could apply for the 'Fixed Penalty' model, 'Time Varying Penalty' model, or both), or could be any value less than the penalty value in the case that the ADL is not scheduled within the desired interval [$es_i$, $ls_i$].

If the savings in the usage cost for the ADLs scheduled in the hard window period is more than the penalties due to the ADLs scheduled beyond the soft window period, the start time assignment is possible. If the start time assignment is not possible and the ADL is not scheduled, the optimization model incorporates an overhead cost associated with the ADL not being scheduled (i.e., OHC$_i$). Thus, the optimization model determines if the savings in usage cost is greater than the penalties accrued. Ultimately, the optimization model executed at the sub-station 106 lowers the costs incurred by the ADLs for individual users while also eliminating potential load imbalances on the smart grid network, which reduces operating costs.

In particular, the optimization model may utilize an objective function that minimizes the cumulative sum of the penalties for all the ADLs scheduled and for the sum of the overhead costs for the ADLs not scheduled. It is important to note that the penalty for the ADL scheduled in the soft window period may be "0" and the penalty for the ADL scheduled outside the soft window period but within the hard window period could be a user defined "step function" or "constant." The objective function is shown below:

Minimize $(w_1*\Sigma_{i\in[1,m]}(\text{Penalty}_i(s_i)*\Sigma_{j\in[1,24]}M_{ij})+(w_2*\Sigma_{i\in[1,m]}(\text{OHC}_i*M_{i0}))$ The optimization model also includes constraints, such as a peak load constraint and a cost constraint. Due to the scheduling of the ADLs in any hour, the load from the ADLs together with the predicted load in that hour from the other users should not go beyond a certain allowed maximum load in that hour (e.g., the maximum allowed load could be the predicted supply in that hour). Therefore, the peak load constraint is as follows.

$\forall_{j\in[1,24]}(\Sigma_{i\in[1,m]}(\text{load}_i*M_{ij})+\text{predLoad}_j)\leq\text{predSupply}_j$ The cost constraint considers that the total cost due to all the scheduled ADLs should not go beyond a certain limit "usage-cost." The cost constraint is as follows. Let (cost$_1$, cost$_2$, ..., cost$_{24}$): be the hourly cost per unit of load (e.g., watts)

$\forall_{j\in[1,24]}((\Sigma_{i\in[1,m]}\text{load}_i*X_{ij})*\text{cost}_j)\leq\text{usagecost}$ In an alternative embodiment, instead of adding the cost constraint, the objective function may contain a third term representing the total usage cost (with a weightage factor), so the total usage cost is minimized. The cost objective function is shown below.

i.e., Term $w_3 * \forall_{j \in [1,24]}((\Sigma_{i \in [1,m]} \text{load}_i * X_{ij}) * \text{cost}_j)$ is added to the minimization objective Next, at step 308, the sub-station 106 transmits the start time information to the smart home control center 102. Thereafter, at step 310, the ADLs are scheduled at the control center 102 at the start time as assigned by the smart grid network 200. Finally, at step 312, energy is transferred to the control center 102 at the start time assigned by the smart grid network 200.

In an alternative embodiment, fair incentives may be provided to the users. If the penalties of any ADL not scheduled are not too costly, or the hard window period limits for the scheduling time are lax, then incentive can be given to the owners of the ADLs during the optimization process (i.e., to the grid-friendly ADL owners). An example of an incentive is allocating specific ADLs during the low "usage cost" periods (i.e., avoid scheduling certain ADLs during peak usage price timings). This is feasible because the optimal schedule may not have all the ADLs scheduled with the same usage cost and few ADLs are scheduled during high "usage cost" period, while other ADLs are scheduled during low "usage cost" periods. Thus, it is possible for the smart grid network 200 to prioritize certain users as part of allocating fair incentives.

In some embodiments, ADL scheduling is periodically run at a specific hour, minute, or fractions thereof. Components that trigger rescheduling can include the change in the demand (i.e., a change in one or more ADL demands, or a change in non-ADL predicted demand, or both) prediction for any hour during the day, a change in the supply prediction for any hour during the day, and a change in the "usage-cost" per unit for any hour during the day. Another rescheduling trigger may be any change in the ADLs to be scheduled, such as ADLs added, removed, or updated with data.

In another embodiment, the optimization model could be developed as a mixed integer linear program. And, the program may be able to produce an optimal feasible ADL allocation schedule in real-time (e.g., a few minutes). It would also be possible to rerun the optimization at a regular interval to implement an ideal schedule.

Currently, the optimization model will either not schedule an ADL or schedule the ADL for a fixed length. In an additional embodiment, the length of the ADL scheduled is a variable length. Examples of ADLs with variable length include appliance activities such as running that air conditioning or running the television. In such scenarios, step functions may be used to model the time-varying behavior (e.g., the greater the ADL schedule length, the lower the penalty).

Ultimately, determining the start time assignments for ADLs at the sub-station 106 level as compared to the local smart home control center 102 level avoid potential load imbalances. Further, the shift to sub-station 106 level scheduling minimizes the overall power usage cost.

While embodiments of the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A system for optimizing power usage on a smart grid network, comprising:
 a unit having a control center with a historical database, the control center in digital communication with a network component of a smart grid; and
 historical data including a variable start time for a flexible ADL, wherein:
  the variable start time is within a soft window period of optimal energy consumption start times ranging between an earliest start time and a latest start time;
  the control center of the unit transmits the variable start time for the flexible ADL to the network component, which schedules a start time for the flexible ADL based at least in part on the flexible ADL's variable start time;
  the network component controls the transfer of energy to the flexible ADL based on the flexible ADL's scheduled start time; and
  the network component calculates a penalty fee based on the flexible ADL having a scheduled start time within a hard window period that extends beyond the soft window period, wherein the penalty fee for the flexible ADL with the scheduled start time within the hard window period increases the later the start time occurs within the hard window period.

2. The system of claim 1, wherein the flexible ADL's scheduled start time is further based, at least in part, on at least one of: a predicted non-ADL demand, a forecasted supply, a forecasted energy tariff structure, and ADL characteristics.

3. The system of claim 1, further comprising historical data including a fixed start time for one or more non-flexible ADLs.

4. The system of claim 3, wherein the control center transmits a fixed start time for each of the non-flexible ADLs to the network component, which schedules a start time for each non-flexible ADL based, at least in part, on each non-flexible ADL's fixed start time.

5. A computer-implemented method for optimizing power usage on a smart grid network, comprising:
 receiving, by a network component of a smart grid from a control center in digital communication with the network component, a variable start time for a flexible Activity of Daily Living (ADL), wherein the variable start time is within a soft window period of optimal energy consumption start times ranging between an earliest start time and a latest start time;
 scheduling, by the network component, a start time for the flexible ADL based, at least in part, on the flexible ADL's variable start time;
 calculating, by the network component, a penalty fee based on the flexible ADL having a scheduled start time within a hard window period that extends beyond the soft window period, wherein the penalty fee for the flexible ADL with the scheduled start time within the hard window period increases the later the start time occurs within the hard window period.

6. The computer-implemented method of claim 5, wherein scheduling the start time for the flexible ADL is further based, at least in part, on a predicted non-ADL demand, a forecasted supply, and a forecasted tariff structure.

7. The computer-implemented method of claim 5, further comprising associating the flexible ADL with an energy-consuming apparatus.

8. A computer program product minimizing power usage on a smart grid network, the computer program product comprising a computer readable storage medium having program instructions embodied therewith, the program instructions are readable by a computer to cause the computer to perform a method comprising the steps of:
- receiving, by a network component of a smart grid from a control center in digital communication with the network component, a variable start time for a flexible Activity of Daily Living (ADL), wherein the variable start time is within a soft window period of optimal energy consumption start times ranging between an earliest start time and a latest start time;
- scheduling, by the network component, a start time for the flexible ADL based at least in part on the flexible ADL's variable start time;
- calculating, by the network component, a penalty fee based on the flexible ADL having a scheduled start time within a hard window period that extends beyond the soft window period, wherein the penalty fee for the flexible ADL with the scheduled start time within the hard window period increases the later the start time occurs within the hard window period.

9. The computer program product of claim 8, wherein the variable start time is based, at least in part, on historical usage data from an energy-consuming apparatus for associated with a flexible ADL.

10. The computer program product of claim 9, further comprising the steps of:
- calculating a usage cost for the flexible ADL having the scheduled start time within the hard window period; and
- comparing the usage cost to the calculated penalty fee for the flexible ADL.

11. The computer program product of claim 9, wherein scheduling the start time for the flexible ADL is further based, at least in part, on a predicted non-ADL demand, a forecasted supply, and a forecasted energy tariff structure.

12. The system of claim 1, wherein the network component controls the transfer of energy to the flexible ADL based on the flexible ADLs scheduled start time.

13. The computer implemented method of claim 1, further comprising:
- controlling, by the network component, the transfer of energy to the flexible ADL based on the flexible ADL's scheduled start time.

14. The computer program product of claim 8, further comprising the step of:
- controlling, by the network component, the transfer of energy to the flexible ADL based on the flexible ADL's scheduled start time.

* * * * *